US010281560B2

(12) United States Patent
Xue et al.

(10) Patent No.: US 10,281,560 B2
(45) Date of Patent: May 7, 2019

(54) POSITIONING METHOD BASED ON TIME DIFFERENCE OF ARRIVAL, USER EQUIPMENT, AND NETWORK DEVICE

(71) Applicant: Huawei Technologies Co., Ltd., Shenzhen, Guangdong (CN)

(72) Inventors: Jiantao Xue, Beijing (CN); Wei Zhu, Shanghai (CN); Bin Su, Shenzhen (CN); Jie Cui, Shenzhen (CN); Anjian Li, Beijing (CN); Hong Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/022,505

(22) Filed: Jun. 28, 2018

(65) Prior Publication Data
US 2018/0306897 A1 Oct. 25, 2018

Related U.S. Application Data

(63) Continuation of application No. PCT/CN2015/099249, filed on Dec. 28, 2015.

(51) Int. Cl.
*H04W 24/00* (2009.01)
*G01S 5/10* (2006.01)
(Continued)

(52) U.S. Cl.
CPC .............. *G01S 5/10* (2013.01); *H04L 5/0048* (2013.01); *H04W 4/029* (2018.02); *H04W 24/10* (2013.01);
(Continued)

(58) Field of Classification Search
CPC ......... G01S 5/10; H04W 4/029; H04W 24/10; H04W 64/003; H04W 88/02; H04L 5/0048; H04M 1/72522; H04M 1/72519
(Continued)

(56) References Cited

U.S. PATENT DOCUMENTS

| 2008/0090588 A1* | 4/2008 | Mizugaki | H04W 84/18 455/456.1 |
| 2010/0136999 A1* | 6/2010 | Kim | G01S 5/0221 455/456.1 |

(Continued)

FOREIGN PATENT DOCUMENTS

| CN | 102711242 A | 10/2012 |
| CN | 102724753 A | 10/2012 |

(Continued)

OTHER PUBLICATIONS

3GPP TS 36.104 V13.1.0 (Sep. 2015), Technical Specification, 3rd Generation Partnership Project; Technical Specification Group Radio Access Network; Evolved Universal Terrestrial Radio Access (E-UTRA); Base Station (BS) radio transmission and reception (Release 13), 156 pages.

(Continued)

*Primary Examiner* — Danh C Le

(57) ABSTRACT

Embodiments of the present disclosure provide a positioning method based on a time difference of arrival, user equipment, and a network device. The method includes: calculating, by user equipment, a first time difference of arrival RSTD1 based on positioning signals sent by a first base station and a second base station at a same moment; calculating a second time difference of arrival RSTD2 based on known location information of the user equipment; calculating a time alignment error TAE based on the RSTD1 and the RSTD2; and performing, based on the TAE, positioning based on a time difference of arrival TDOA. According to this method, the TAE caused by the base stations is subtracted during positioning calculation. In other words, the time alignment error caused by the base stations is eliminated. Therefore, accuracy of TDOA-based positioning can be ensured.

16 Claims, 15 Drawing Sheets

(51) Int. Cl.
*H04W 64/00* (2009.01)
*H04W 4/029* (2018.01)
*H04L 5/00* (2006.01)
*H04W 24/10* (2009.01)
*H04M 1/725* (2006.01)

(52) U.S. Cl.
CPC ......... *H04W 64/00* (2013.01); *H04W 64/003* (2013.01); *H04M 1/72519* (2013.01); *H04M 1/72522* (2013.01)

(58) Field of Classification Search
USPC ............ 455/456.1, 550.1, 456.5; 342/357.26
See application file for complete search history.

(56) References Cited

U.S. PATENT DOCUMENTS

| | | | |
|---|---|---|---|
| 2012/0015667 A1 | 1/2012 | Woo et al. | |
| 2013/0271324 A1* | 10/2013 | Sendonaris | G01S 5/02 342/450 |
| 2013/0314277 A1* | 11/2013 | Cheng | G01S 19/43 342/357.26 |
| 2013/0324163 A1 | 12/2013 | Werner et al. | |
| 2013/0337835 A1 | 12/2013 | Choi | |
| 2014/0016485 A1* | 1/2014 | Curticapean | G01S 5/12 370/252 |
| 2014/0171111 A1 | 6/2014 | Xiao et al. | |
| 2016/0234709 A1* | 8/2016 | Fischer | H04W 4/02 |
| 2017/0090009 A1* | 3/2017 | Amishima | G01S 5/06 |
| 2017/0090038 A1* | 3/2017 | Saito | G01S 19/41 |
| 2018/0146332 A1* | 5/2018 | Opshaug | H04W 4/023 |

FOREIGN PATENT DOCUMENTS

| | | |
|---|---|---|
| CN | 102958154 A | 3/2013 |
| CN | 103261911 A | 8/2013 |
| CN | 104380816 A | 2/2015 |
| WO | 2005/051034 A1 | 6/2005 |

OTHER PUBLICATIONS

Intel Corporation, "On RSTD report mapping", 3GPP TSG-RAN WG4 Meeting #77, Anaheim, US, Nov. 16-20, 2015, 5 pages, R4-157003.

* cited by examiner

POSITIONING METHOD BASED ON TIME DIFFERENCE OF ARRIVAL, USER EQUIPMENT, AND NETWORK DEVICE

CROSS-REFERENCE TO RELATED APPLICATIONS

This application is a continuation of International Application No. PCT/CN2015/099249, filed on Dec. 28, 2015, the disclosure of which is hereby incorporated by reference in its entirety.

TECHNICAL FIELD

The present application relates to positioning technologies, and in particular, to a positioning method based on a time difference of arrival, user equipment, and a network device.

BACKGROUND

With development of communications services, location services are playing an important role as an indispensable part of mobile communication and personal communication services. The location service is a value-added service that obtains location information, namely, longitudinal and latitudinal coordinates, of a mobile terminal user by using an operator network (for example, an LTE network) and provides a corresponding service for the user with support of an electronic map platform. In recent years, with unceasing improvement of people's material standards of living, people are having increasingly high requirements on location services, for example, extensive requirements on positioning in aspects such as security surveillance, emergency rescue, and travel guide.

Currently, a positioning method based on a time difference of arrival (TDOA) is an important method for implementing the location service. Depending on different reference signal directions, the TDOA-based positioning method may be divided into positioning based on an observed time difference of arrival (OTDOA) and positioning based on an uplink time difference of arrival (UTDOA). A basic principle of the TDOA-based positioning method is as follows: When there are three or more base stations in a system, a location of user equipment (UE) may be determined based on reference signal time differences (RSTD) of positioning reference signals (PRS) that are sent simultaneously by different base stations and transmitted in a downlink direction or of sounding reference signals (SRS) that are sent simultaneously by the UE to different base stations and transmitted in an uplink direction.

However, because the different base stations have different local oscillators, or because of another reason, different absolute times are generated. As a result, signals generated from or signals received by antenna ports of the base stations are not absolutely time-synchronized. This is referred to as a time alignment error (TAE). When the TDOA-based positioning method is used for positioning, the TAE is added to the RSTD, leading to an error in TDOA-based positioning, so that TDOA-based positioning is undesirably accurate.

SUMMARY

The present disclosure provides a positioning method based on a time difference of arrival, user equipment, and a network device, to resolve a prior-art problem that a TAE causes low accuracy of TDOA-based positioning.

A first aspect of the present disclosure provides a positioning method based on a time difference of arrival, and the method includes:

receiving, by user equipment UE, a first positioning signal sent by a first base station at a first moment and a second positioning signal sent by a second base station at the first moment;

obtaining, by the UE, a first time difference of arrival RSTD1 based on measurement information of the first positioning signal and measurement information of the second positioning signal, where the measurement information includes at least one of an arrival time of the positioning signal and a received power of the positioning signal;

obtaining, by the UE, location information of the first base station, location information of the second base station, and location information of the UE; and obtaining, by the UE, a time alignment error TAE based on the location information of the first base station, the location information of the second base station, the location information of the UE, and the RSTD1, and reporting the TAE to a network device, where the TAE is used for positioning.

With reference to the first aspect, in a first possible implementation of the first aspect, the obtaining, by the UE, a time alignment error TAE based on the location information of the first base station, the location information of the second base station, the location information of the UE, and the RSTD1 includes:

obtaining, by the UE, a second time difference of arrival RSTD2 based on the location information of the first base station, the location information of the second base station, and the location information of the UE; and calculating, by the UE, a difference between the RSTD1 and the RSTD2, and using the difference as the TAE.

With reference to the first possible implementation of the first aspect, in a second possible implementation of the first aspect, the obtaining, by the UE, a second time difference of arrival RSTD2 based on the location information of the first base station, the location information of the second base station, and the location information of the UE includes:

calculating, by the UE, a first distance between the UE and the first base station based on the location information of the UE and the location information of the first base station;

calculating, by the UE, a second distance between the UE and the second base station based on the location information of the UE and the location information of the second base station;

calculating, by the UE, a difference between the first distance and the second distance; and calculating, by the UE, a ratio of the difference to an electromagnetic wave velocity, and using the ratio as the RSTD2.

A second aspect of the present disclosure provides a positioning method based on a time difference of arrival, including:

receiving, by a network device, a first time alignment error TAE reported by UE; and performing, by the network device based on the first TAE, positioning based on a time difference of arrival TDOA on at least one UE.

With reference to the second aspect, in a first possible implementation of the second aspect, after the performing, by the network device based on the first TAE, positioning based on a time difference of arrival TDOA on at least one UE, the method further includes:

receiving, by the network device, at least one second TAE reported by the UE or by at least one other UE;

performing, by the network device, weighting processing on the first TAE and the at least one second TAE, to obtain a target TAE; and performing, by the network device, TDOA-based positioning on the UE or the at least one other UE based on the target TAE.

With reference to the first possible implementation of the second aspect, in a second possible implementation of the second aspect, the performing, by the network device, weighting processing on the first TAE and the at least one second TAE, to obtain a target TAE includes:

calculating, by the network device, an average value of the first TAE and the at least one second TAE, to obtain the target TAE.

With reference to the first possible implementation of the second aspect, in a third possible implementation of the second aspect, the performing, by the network device, weighting processing on the first TAE and the at least one second TAE, to obtain a target TAE includes:

calculating, by the network device, a product of a preset weight value of each TAE and each TAE value based on preset weight values of the first TAE and the at least one second TAE, and using the product as a weighted TAE corresponding to each TAE; and adding, by the network device, weighted TAEs of the first TAE and the at least one second TAE, and using a resulting sum as the target TAE.

A third aspect of the present disclosure provides a positioning method based on a time difference of arrival, including:

obtaining, by a network device, a first time difference of arrival RSTD1;

calculating, by the network device, a second time difference of arrival RSTD2 based on initial location information of UE;

calculating, by the network device, a time alignment error TAE based on the RSTD1 and the RSTD2; and performing, by the network device based on the TAE, positioning based on a time difference of arrival TDOA.

With reference to the third aspect, in a first possible implementation of the third aspect, the calculating, by the network device, a TAE based on the RSTD1 and the RSTD2 includes:

calculating, by the network device, a difference between the RSTD1 and the RSTD2, and using the difference as the target TAE.

With reference to the third aspect, in a second possible implementation of the third aspect, the calculating, by the network device, a TAE based on the RSTD1 and the RSTD2 includes:

calculating, by the network device, a difference between the RSTD1 and the RSTD2, and using the difference between the RSTD1 and the RSTD2 as a TAE;

calculating, by the network device, a difference between the RSTD1 and the TAE, and performing positioning calculation based on the difference between the RSTD1 and the TAE, to obtain new location information of the UE;

obtaining, by the network device, a new RSTD1, calculating a difference between the new RSTD1 and a new RSTD2 calculated by using the new location information, and using the difference between the new RSTD1 and the new RSTD2 as a new TAE; and obtaining the target TAE based on the new TAE.

With reference to the third aspect, in a third possible implementation of the third aspect, the obtaining, by a network device, a first time difference of arrival RSTD1 includes:

receiving, by the network device, the first time difference of arrival RSTD1 reported by the UE, where the RSTD1 is obtained through calculation by the UE based on a first positioning signal sent by a first base station and a second positioning signal sent by a second base station.

With reference to the third aspect, in a fourth possible implementation of the third aspect, the obtaining, by a network device, a first time difference of arrival RSTD1 includes:

receiving, by the network device, first received time information and/or first received power information reported by a first base station, and second received time information and/or second received power information reported by a second base station; and calculating, by the network device, the first time difference of arrival RSTD1 based on the first received time information and/or the first received power information and the second received time information or/and the second received power information.

With reference to the third aspect, in a fifth possible implementation of the third aspect, before the calculating, by the network device, a second time difference of arrival RSTD2 based on initial location information of UE, the method further includes:

receiving, by the network device, the initial location information reported by the UE.

With reference to the third aspect, in a sixth possible implementation of the third aspect, before the calculating, by the network device, a second time difference of arrival RSTD2 based on initial location information of UE, the method further includes:

calculating, by the network device, the initial location information of the UE.

With reference to the third aspect, in a seventh possible implementation of the third aspect, after the calculating, by the network device, a time alignment error TAE based on the RSTD1 and the RSTD2, the method further includes:

calculating, by the network device, at least one other TAE;

performing, by the network device, weighting processing on the TAE and the at least one other TAE, to obtain a target TAE; and performing, by the network device, TDOA-based positioning based on the target TAE.

With reference to the seventh possible implementation of the third aspect, in an eighth possible implementation of the third aspect, the performing, by the network device, weighting processing on the TAE and the at least one other TAE, to obtain a target TAE includes:

calculating, by the network device, an average value of the TAE and the at least one other TAE, to obtain the target TAE.

With reference to the seventh possible implementation of the third aspect, in a ninth possible implementation of the third aspect, the performing, by the network device, weighting processing on the TAE and the at least one other TAE, to obtain a target TAE includes:

calculating, by the network device, a product of a preset weight value of each TAE and each TAE value based on preset weight values of the TAE and the at least one other TAE, and using the product as a weighted TAE corresponding to each TAE; and adding, by the network device, weighted TAEs of the TAE and the at least one other TAE, and using a resulting sum as the target TAE.

With reference to any one of the first possible implementation of the third aspect, the second possible implementation of the third aspect, the eighth possible implementation of the third aspect, and the ninth possible implementation of the third aspect, in a tenth possible implementation of the third aspect, the method further includes:

sending, by the network device, the target TAE to the UE or another UE.

A fourth aspect of the present disclosure provides user equipment, including:

a receiver, configured to receive a first positioning signal sent by a first base station at a first moment and a second positioning signal sent by a second base station at the first moment;

a processor, configured to: obtain a first time difference of arrival RSTD1 based on an arrival time or an arrival power of the first positioning signal and an arrival time or an arrival power of the second positioning signal; obtain location information of the first base station, location information of the second base station, and location information of the user equipment UE; and obtain a time alignment error TAE based on the location information of the first base station, the location information of the second base station, the location information of the UE, and the RSTD1; and a transmitter, configured to report the TAE to a network device, where the TAE is used for positioning.

With reference to the fourth aspect, in a first possible implementation of the fourth aspect, the processor is specifically configured to:

obtain a second time difference of arrival RSTD2 based on the location information of the first base station, the location information of the second base station, and the location information of the UE; and calculate a difference between the RSTD1 and the RSTD2, and use the difference as the TAE.

With reference to the first possible implementation of the fourth aspect, in a second possible implementation of the fourth aspect, the processor is further specifically configured to:

calculate a first distance between the UE and the first base station based on the location information of the UE and the location information of the first base station;

calculate a second distance between the UE and the second base station based on the location information of the UE and the location information of the second base station;

calculate a difference between the first distance and the second distance; and calculate a ratio of the difference to an electromagnetic wave velocity, and use the ratio as the RSTD2.

A fifth aspect of the present disclosure provides a network device, including:

a receiver, configured to receive a first time alignment error TAE reported by UE; and a processor, configured to perform, based on the first TAE, positioning based on a time difference of arrival TDOA on at least one UE.

With reference to the fifth aspect, in a first possible implementation of the fifth aspect, the processor is further configured to:

receive at least one second TAE reported by the UE or by at least one other UE;

perform weighting processing on the first TAE and the at least one second TAE, to obtain a target TAE; and perform TDOA-based positioning on the UE or the at least one other UE based on the target TAE.

With reference to the first possible implementation of the fifth aspect, in a second possible implementation of the fifth aspect, the processor is further specifically configured to:

calculate an average value of the first TAE and the at least one second TAE, to obtain the target TAE.

With reference to the first possible implementation of the fifth aspect, in a third possible implementation of the fifth aspect, the processor is further specifically configured to:

calculate a product of a preset weight value of each TAE and each TAE value based on preset weight values of the first TAE and the at least one second TAE, and use the product as a weighted TAE corresponding to each TAE; and add weighted TAEs of the first TAE and the at least one second TAE, and use a resulting sum as the target TAE.

A sixth aspect of the present disclosure provides a network device, including:

a receiver, configured to obtain a first time difference of arrival RSTD1;

a processor, configured to calculate a second time difference of arrival RSTD2 based on initial location information of UE; and a second calculation module, configured to: calculate a TAE based on the RSTD1 and the RSTD2, and perform, based on the TAE, positioning based on a time difference of arrival TDOA.

With reference to the sixth aspect, in a first possible implementation of the sixth aspect, the processor is specifically configured to: calculate a difference between the RSTD1 and the RSTD2, and use the difference as the target TAE.

With reference to the sixth aspect, in a second possible implementation of the sixth aspect, the processor is further specifically configured to:

calculate a difference between the RSTD1 and the RSTD2, and use the difference between the RSTD1 and the RSTD2 as a TAE;

calculate a difference between the RSTD1 and the TAE, and perform positioning calculation based on the difference between the RSTD1 and the TAE, to obtain new location information of the UE;

obtain a new RSTD1, calculate a difference between the new RSTD1 and a new RSTD2 calculated by using the new location information, and use the difference between the new RSTD1 and the new RSTD2 as a new TAE; and obtain the target TAE based on the new TAE.

With reference to the sixth aspect, in a third possible implementation of the sixth aspect, the receiver is further configured to receive the first time difference of arrival RSTD1 reported by the UE, where the RSTD1 is obtained through calculation by the UE based on a first positioning signal sent by a first base station and a second positioning signal sent by a second base station.

With reference to the sixth aspect, in a fourth possible implementation of the sixth aspect, the receiver is further configured to receive first received time information reported by a first base station and second received time information reported by a second base station; and correspondingly, the processor is further configured to calculate the first time difference of arrival RSTD1 based on the first received time information and the second received time information.

With reference to the sixth aspect, in a fifth possible implementation of the sixth aspect, the processor is further configured to: before calculating the second time difference of arrival RSTD2 based on the initial location information of the UE, receive the initial location information reported by the UE.

With reference to the sixth aspect, in a sixth possible implementation of the sixth aspect, the processor is further configured to: before calculating the second time difference of arrival RSTD2 based on the initial location information of the UE, calculate the initial location information of the UE.

With reference to the sixth aspect, in a seventh possible implementation of the sixth aspect, the processor is further configured to: calculate at least one other TAE after calculating the time alignment error TAE based on the RSTD1 and the RSTD2;

perform weighting processing on the TAE and the at least one other TAE, to obtain a target TAE; and perform TDOA-based positioning based on the target TAE.

With reference to the seventh possible implementation of the sixth aspect, in an eighth possible implementation of the sixth aspect, the processor is further specifically configured to: calculate an average value of the TAE and the at least one other TAE, to obtain the target TAE.

With reference to the seventh possible implementation of the sixth aspect, in a ninth possible implementation of the sixth aspect, the processor is further specifically configured to:

calculate a product of a preset weight value of each TAE and each TAE value based on preset weight values of the TAE and the at least one other TAE, and use the product as a weighted TAE corresponding to each TAE; and add weighted TAEs of the TAE and the at least one other TAE, and use a resulting sum as the target TAE.

With reference to any one of the first possible implementation of the sixth aspect, the second possible implementation of the sixth aspect, the eighth possible implementation of the sixth aspect, and the ninth possible implementation of the sixth aspect, in a tenth possible implementation of the sixth aspect, the network device further includes:

a transmitter, configured to send the target TAE to the UE or another UE.

According to the positioning method based on a time difference of arrival provided in the present disclosure, the TAE is first calculated, and then TDOA calculation is performed based on the TAE. The TAE caused by the base stations is subtracted during positioning calculation. In other words, the time alignment error caused by the base stations is eliminated. Therefore, accuracy of TDOA-based positioning can be ensured.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
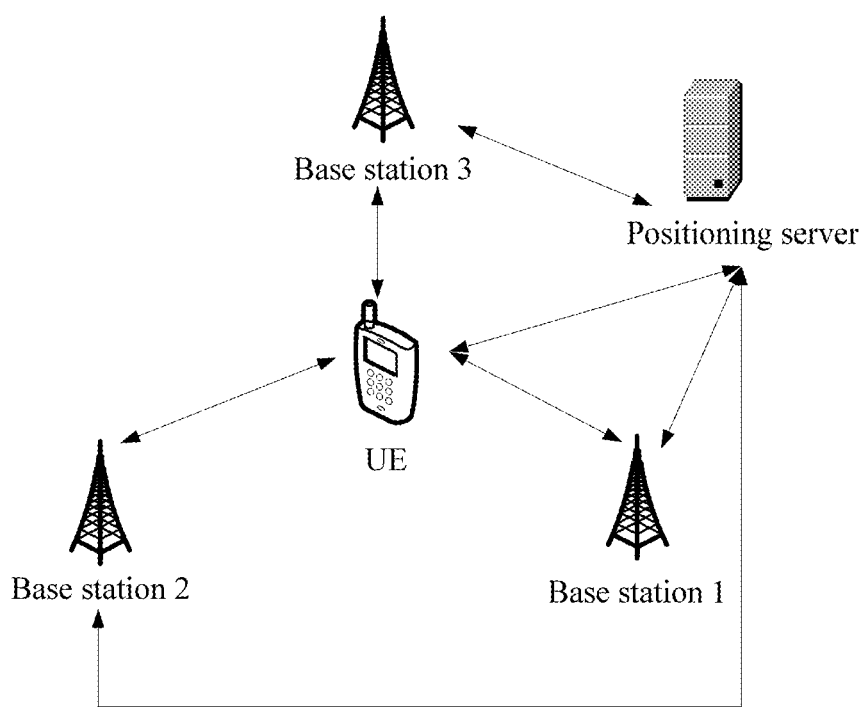
FIG. 1 is a diagram of a system architecture for a positioning method based on a time difference of arrival according to the embodiments of the present disclosure.

FIG. 1 is a diagram of a system architecture for a positioning method based on a time difference of arrival according to an embodiment of the present disclosure. As shown in FIG. 1, UE communicates with abase station 1, abase station 2, and abase station 3, and a network device communicates with the UE, the base station 1, the base station 2, and the base station 3. A TDOA-based positioning process is used as an example. In this system architecture, the base station 1, the base station 2, and the base station 3 send positioning signals to the UE simultaneously, and the UE calculates a received time 1 or/and a received power 1, a received time 2 or/and a received power 2, and a received time 3 or/and a received power 3 for the positioning signals of the base station 1, the base station 2, and the base station 3, respectively. The UE converts the received power 1, the received power 2, and the received power 3 to a received distance 1, a received distance 2, and a received distance 3 by using a channel fading model, and divides the receive distance 1, the receive distance 2, and the receive distance 3 by an electromagnetic wave velocity to obtain a received time 1~, a received time 2~, and a received time 3~. The UE weights the received time 1 and the received time 1~ to generate a received time 4, weights the received time 2 and the received time 2~ to generate a received time 5, and weights the received time 3 and the received time 3~ to generate a received time 6.

A weighted received time value corresponding to the received time 1 and the received time 1~ may be calculated by using the following formula:

Received time 4=$w$*(Received time 1)+(1−$w$)(Received time 1~), where 0≤$w$≤1.

Then, the UE performs subtraction on each two of the received time 4, the received time 5, and the received time 6, to obtain three RSTDs. The UE reports the three RSTDs to the network device, and the network device writes three hyperbolic equations based on the three RSTDs and coordinate information of the base station 1, the base station 2, and the base station 3 to obtain location information of the UE.

A main purpose of the present disclosure is to calculate a TAE caused by the base stations, and remove the TAE from the RSTD during subsequent TDOA-based positioning, or in other words, eliminate a time difference caused by the base stations, thereby improving accuracy of TDOA-based positioning.

The network device in the present disclosure may be a network-side device such as a base station, a positioning server, or a proprietary server. The base station in the present disclosure includes a wireless access point (Wireless Access Point), an RRU (Radio Remote Unit), an RRH (Remote Radio Head), or the like.

Figure 2:
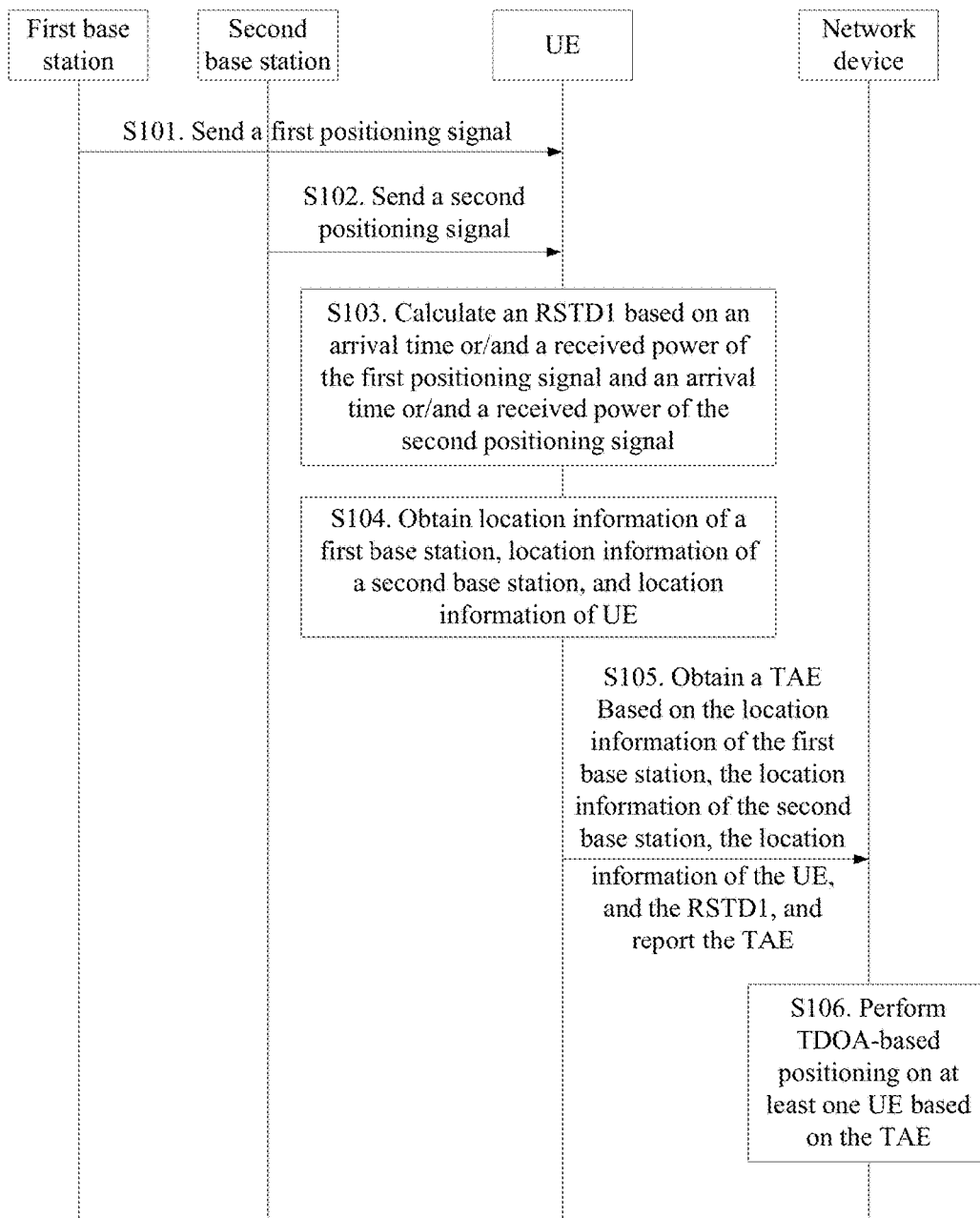
FIG. 2 is an interaction flowchart of Embodiment 1 of the positioning method based on a time difference of arrival according to the embodiments of the present disclosure.

FIG. 2 is an interaction flowchart of Embodiment 1 of the positioning method based on a time difference of arrival according to the embodiments of the present disclosure. As shown in FIG. 2, the method includes the following steps.

S101. A first base station sends a first positioning signal to UE at a first moment.

S102. A second base station sends a second positioning signal to the UE at the first moment.

S103. The UE receives the first positioning signal sent by the first base station and the second positioning signal sent by the second base station, and calculates a first time difference of arrival RSTD1 based on an arrival time or/and a received power of the first positioning signal and an arrival time or/and a received power of the second positioning signal.

S104. The UE obtains location information of the first base station, location information of the second base station, and location information of the UE.

Specifically, the UE may obtain the location information of the first base station and the location information of the second base station by sending request messages to the first base station and the second base station. The UE may use another positioning technology to obtain the location information of the UE, for example, using the Global Positioning System to obtain accurate location information of the UE.

S105. The UE obtains a time alignment error TAE based on the location information of the first base station, the location information of the second base station, the location information of the UE, and the RSTD1, and reports the TAE to a network device, where the TAE is used for positioning.

Specifically, the UE may obtain a theoretical RSTD between the first base station and the second base station based on the location information of the first base station, the location information of the second base station, and the location information of the UE, and then obtain the TAE between the first base station and the second base station based on the theoretical RSTD and the actually calculated RSTD1. After calculating the TAE, the UE reports the TAE to the network device, so that the network device can position different UEs based on the TAE.

S106. The network device receives the TAE reported by the UE, and performs TDOA-based positioning on at least one UE based on the TAE.

Specifically, during positioning, the network device first subtracts the TAE from the RSTD, and then may perform positioning according to a prior-art TDOA-based method, without being limited thereto.

In this embodiment, the UE obtains, based on the RSTD1 calculated based on the actual received times of the positioning signals and based on the location information of the first base station, the location information of the second base station, and the location information of the UE, the TAE caused by the base stations, and reports the TAE to the network device. In a positioning calculation process, the network device subtracts the TAE before performing positioning calculation. The TAE caused by the base stations is subtracted during positioning calculation. In other words, the time alignment error caused by the base stations is eliminated. Therefore, accuracy of TDOA-based positioning can be ensured.

Figure 3:
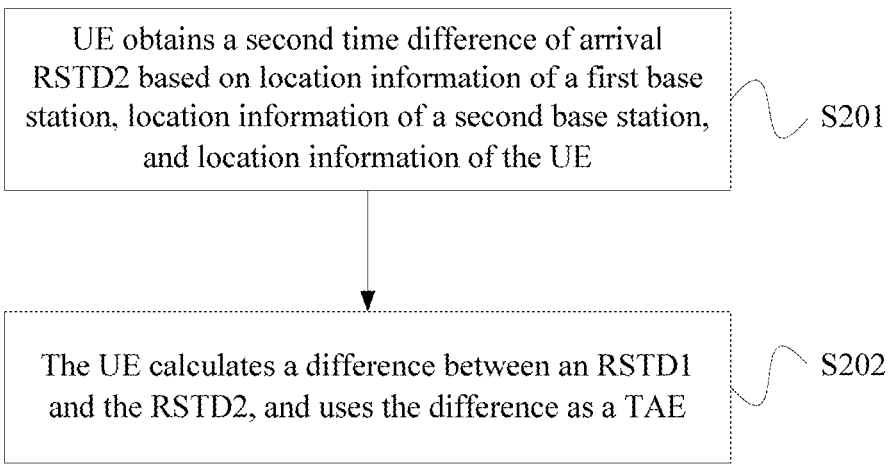
FIG. 3 is a schematic flowchart of Embodiment 2 of the positioning method based on a time difference of arrival according to the embodiments of the present disclosure.

FIG. 3 is a schematic flowchart of Embodiment 2 of the positioning method based on a time difference of arrival according to the embodiments of the present disclosure. As shown in FIG. 3, step S105 may specifically include the following steps:

S201. The UE obtains a second time difference of arrival RSTD2 based on the location information of the first base station, the location information of the second base station, and the location information of the UE.

S202. The UE calculates a difference between the RSTD1 and the RSTD2, and uses the difference as the TAE.

In this embodiment, the UE calculates the theoretical RSTD2 between the first base station and the second base station based on the location information of the first base station, the location information of the second base station, and the location information of the UE, and obtains the difference between the RSTD1 and the RSTD2. In this way, the TAE between the first base station and the second base station may be calculated.

Figure 4:
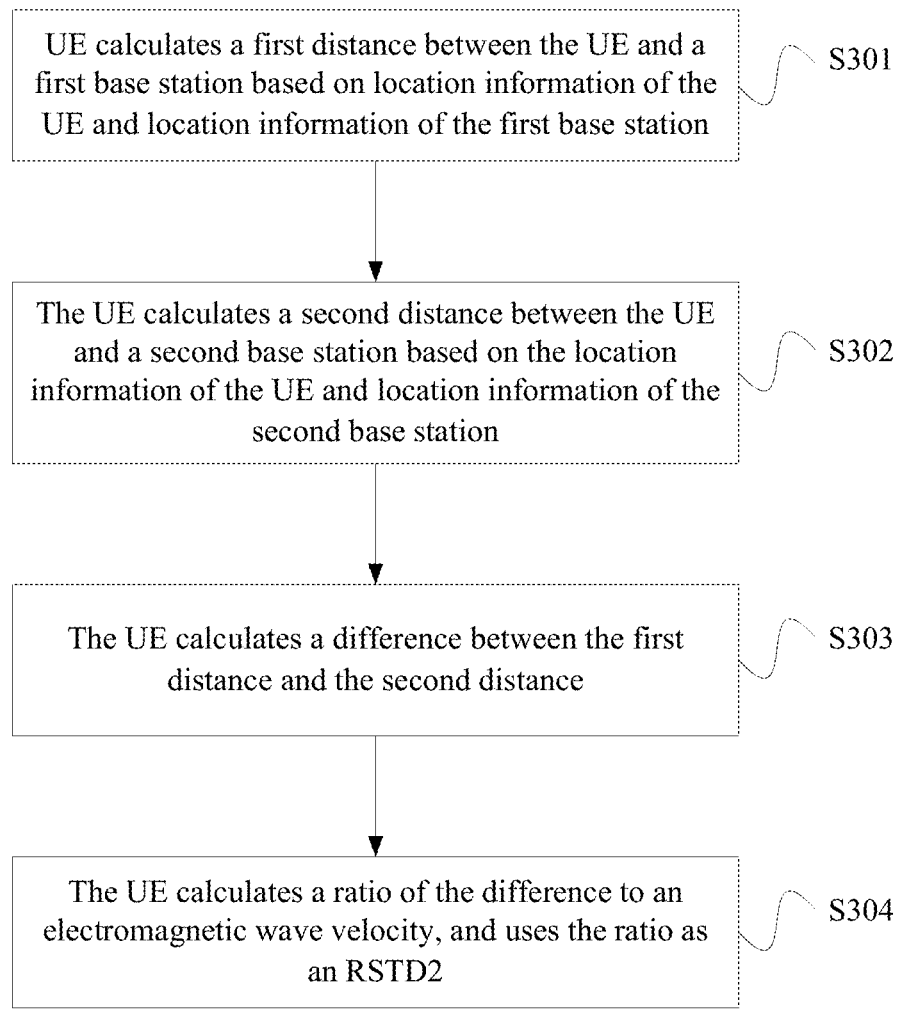
FIG. 4 is a schematic flowchart of Embodiment 3 of the positioning method based on a time difference of arrival according to the embodiments of the present disclosure.

FIG. 4 is a schematic flowchart of Embodiment 3 of the positioning method based on a time difference of arrival according to the embodiments of the present disclosure. As shown in FIG. 4, step S201 may specifically include the following steps:

S301. The UE calculates a first distance between the UE and the first base station based on the location information of the UE and the location information of the first base station.

S302. The UE calculates a second distance between the UE and the second base station based on the location information of the UE and the location information of the second base station.

S303. The UE calculates a difference between the first distance and the second distance.

S304. The UE calculates a ratio of the difference to an electromagnetic wave velocity, and uses the ratio as the RSTD2.

According to this embodiment, the RSTD2 supposed to exist theoretically may be calculated, and a calculation result is used as a reference value for comparison with the actual RSTD, thereby ensuring accuracy of the calculated TAE.

Figure 5:
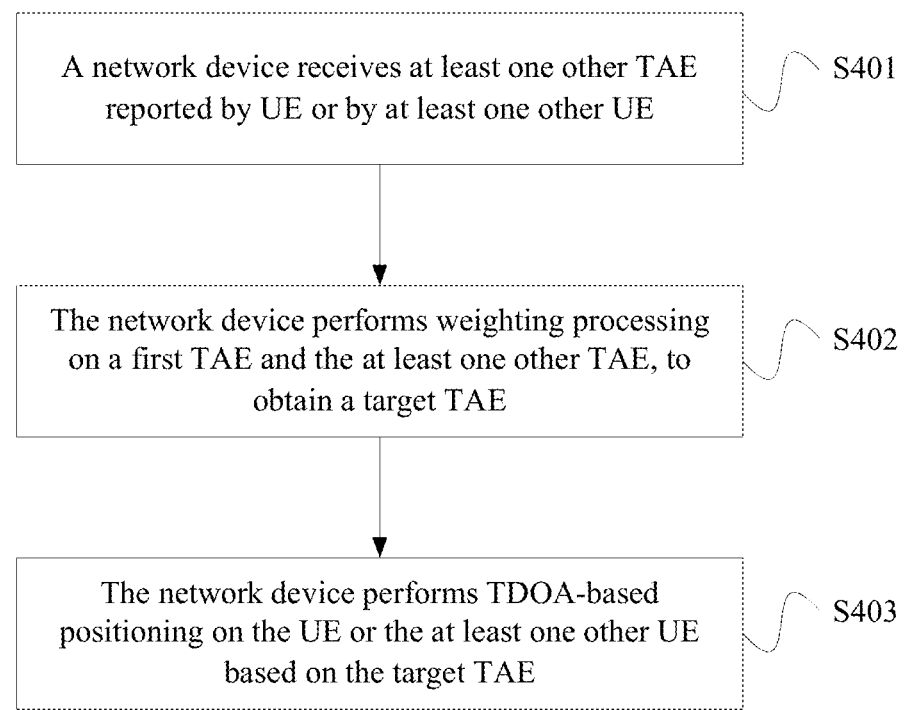
FIG. 5 is a schematic flowchart of Embodiment 4 of the positioning method based on a time difference of arrival according to the embodiments of the present disclosure.

FIG. 5 is a schematic flowchart of Embodiment 4 of the positioning method based on a time difference of arrival according to the embodiments of the present disclosure. As shown in FIG. 5, after the TAE is calculated in the foregoing Embodiment 1 and Embodiment 2, the method further includes the following steps.

S401. The network device receives at least one other TAE reported by the UE or by at least one other UE.

Specifically, the other TAE is obtained, by the UE in a location different from the known location described in the foregoing embodiments or by the UE at another time point, through calculation based on the location information, the positioning signal sent by the first base station, and the positioning signal sent by the second base station. Alternatively, the other TAE is at least one other TAE reported by the at least one other UE.

Optionally, the UE may calculate TAEs periodically, and reports each calculated TAE to the network device. The network device stores the TAE received each time.

S402. The network device performs weighting processing on a first TAE and the at least one other TAE, to obtain a target TAE.

The first TAE is the TAE calculated in the foregoing Embodiment 1 and Embodiment 2.

S403. The network device performs TDOA-based positioning on the UE or the at least one other UE based on the target TAE.

Specifically, the prior-art TDOA-based method may be used for positioning in a location service. However, during positioning, the TAE first needs to be subtracted from the RSTD, and a hyperbolic equation is set up based on the RSTD.

In this embodiment, the network device receives a plurality of other TAEs calculated by the same UE in different locations or the at least one other TAE calculated by the at least one other UE; after receiving the plurality of TAEs, performs weighting processing on the plurality of TAEs to obtain the target TAE; and uses the target TAE to perform TDOA-based positioning. The TAE obtained after weighting processing is based on TAE data of a plurality of periods or a plurality of UEs, and is therefore more accurate, and a result of TDOA-based positioning performed based on the average value is also more accurate.

In an implementation of step S402, when performing weighting processing on the first TAE and the at least one other TAE, the network device may calculate an average value of the first TAE and the at least one other TAE, and use the average value as the target TAE.

Optionally, the network device may preset a quantity of TAEs that require weighting processing. When received TAEs reach the preset quantity, the network device averages the TAEs.

Figure 6:
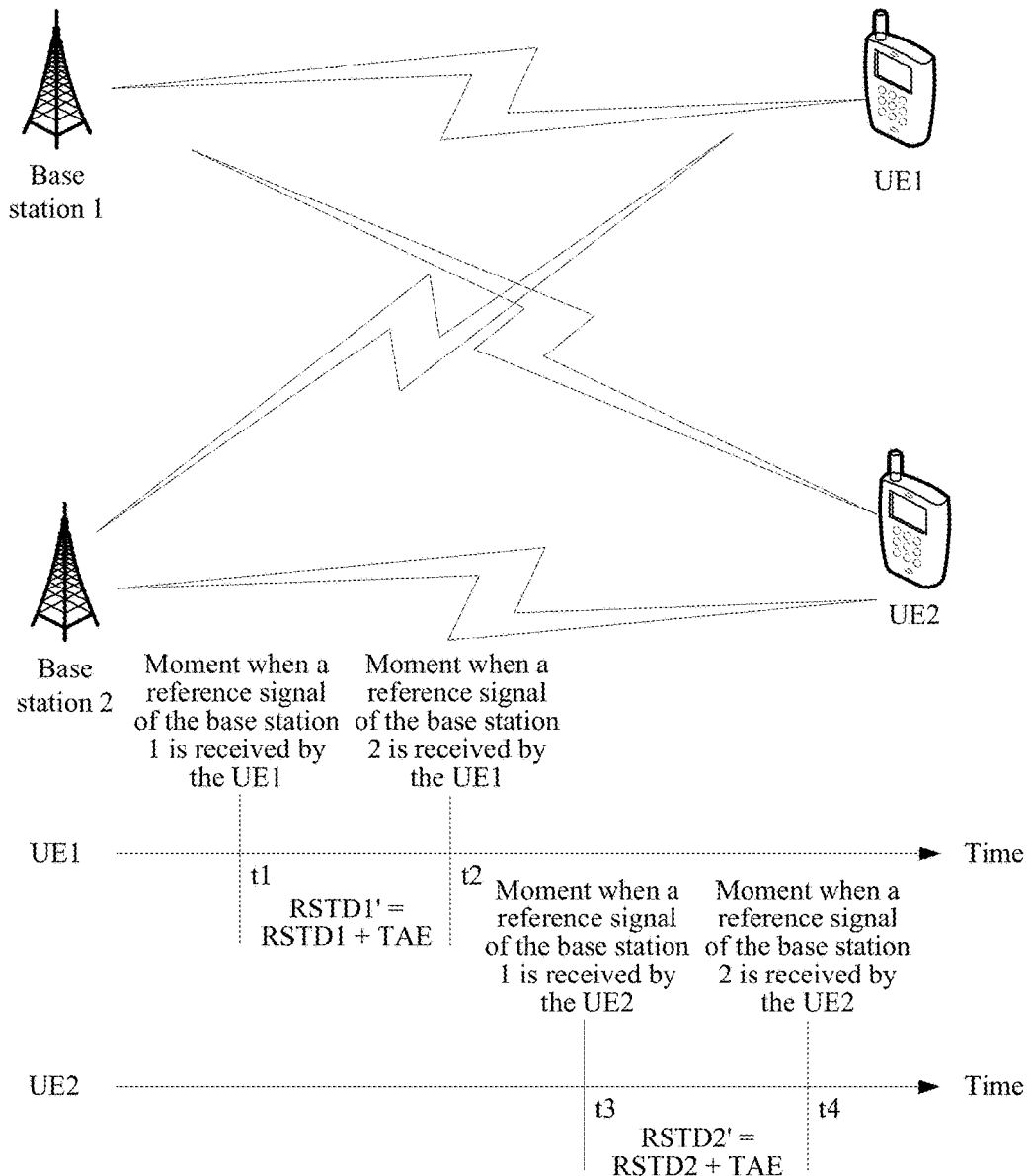
FIG. 6 is a diagram of an example in which an averaging method is used to perform weighting processing, according to the present disclosure.

FIG. 6 is a diagram of an example in which an averaging method is used to perform weighting processing, according to the present disclosure. As shown in FIG. 6, both UE1 and UE2 receive reference signals sent by a base station 1 and a base station 2, the base station 1 and the base station 2 send the reference signals at a same moment, a moment when the reference signal of the base station 1 is received by the UE1 is t1, a moment when the reference signal of the base station 2 is received by the UE1 is t2, a moment when the reference signal of the base station 1 is received by the UE2 is t3, and a moment when the reference signal of the base station 2 is received by the UE2 is t4. The UE1 performs calculation based on its actual location to obtain an expected time difference of arrival of the reference signal, RSTD1. The UE2 performs calculation based on its actual location to obtain an expected time difference of arrival of the reference signal, RSTD2. It is assumed that an actual time difference of arrival corresponding to the UE1 is RSTD1' and an actual time difference of arrival corresponding to the UE2 is RSTD2'. An average value of TAEs corresponding to the UE1 and the UE2 may be calculated by using the following formulas:

$$RSTD1'=RSTD1+TAE=t2-t1+TAE$$

$$RSTD2'=RSTD2+TAE=t4-t3+TAE$$

$$TAE=((RSTD1'-RSTD1)+(RSTD2'-RSTD2))/2$$

In another implementation of step S402, the network device calculates a product of a preset weight value of each TAE and each TAE value based on preset weight values of the first TAE and at least one second TAE, and uses the product as a weighted TAE corresponding to each TAE. Further, the network device adds weighted TAEs of the first TAE and the at least one second TAE, and uses a resulting sum as the target TAE.

Specifically, it is assumed that a TAE obtained by the network device for the UE1 in one location is a TAE1, and a preset weight value of the TAE1 is w1, that a TAE obtained for the UE1 in another location is a TAE2, and a preset weight value of the TAE2 is w2, and that a TAE obtained for the UE2 is a TAE3, and a preset weight value of the TAE3 is w3. Then, a formula for calculating the target TAE is:

$$TAE=w1*TAE1+w2*TAE2+\ldots+w3*TAE3,$$

where w1+w2+ . . . +w3=1.

Alternatively, the target TAE may be calculated based on TAEs of different UEs and weights of the TAEs. For example, it is assumed that a TAE obtained by the network device for the UE1 is a TAE1, and a preset weight value of the TAE1 is w1, that a TAE obtained for the UE2 is a TAE2, and a preset weight value of the TAE2 is w2, and that a TAE obtained for UE3 is a TAE3, and a preset weight value of the TAE3 is w3. Then, a formula for calculating the target TAE is:

$$TAE=w1*TAE1+w2*TAE2+ \ldots +w3*TAE3,$$

where w1+w2+ . . . +w3=1.

It should be noted that a preset weight value may be set depending on an actual condition of UE. For example, if UE is located in a region with a relatively good channel condition, a greater weight value may be set for a TAE obtained for the UE, indicating that the TAE is closer to an actual TAE. Otherwise, a smaller weight value may be set for a TAE.

In another embodiment, the UE does not calculate the TAE, but instead receive TAE information from the network device. The TAE is a TAE obtained by the network device by performing positioning calculation on another UE in proximity, or the TAE is obtained by the network device by collecting and weighting a TAE reported by another UE in proximity.

For example, the UE receives a first positioning signal sent by a first base station at a first moment and a second positioning signal sent by a second base station at the first moment; the UE calculates an RSTD1 based on an arrival time of the first positioning signal and an arrival time of the second positioning signal; and the UE calculates an RSTD3 resulting after the RSTD1 is compensated by the TAE.

For example, RSTD3=RSTD1−TAE.

The UE reports the RSTD3 to the base station or the network device.

Figure 7:
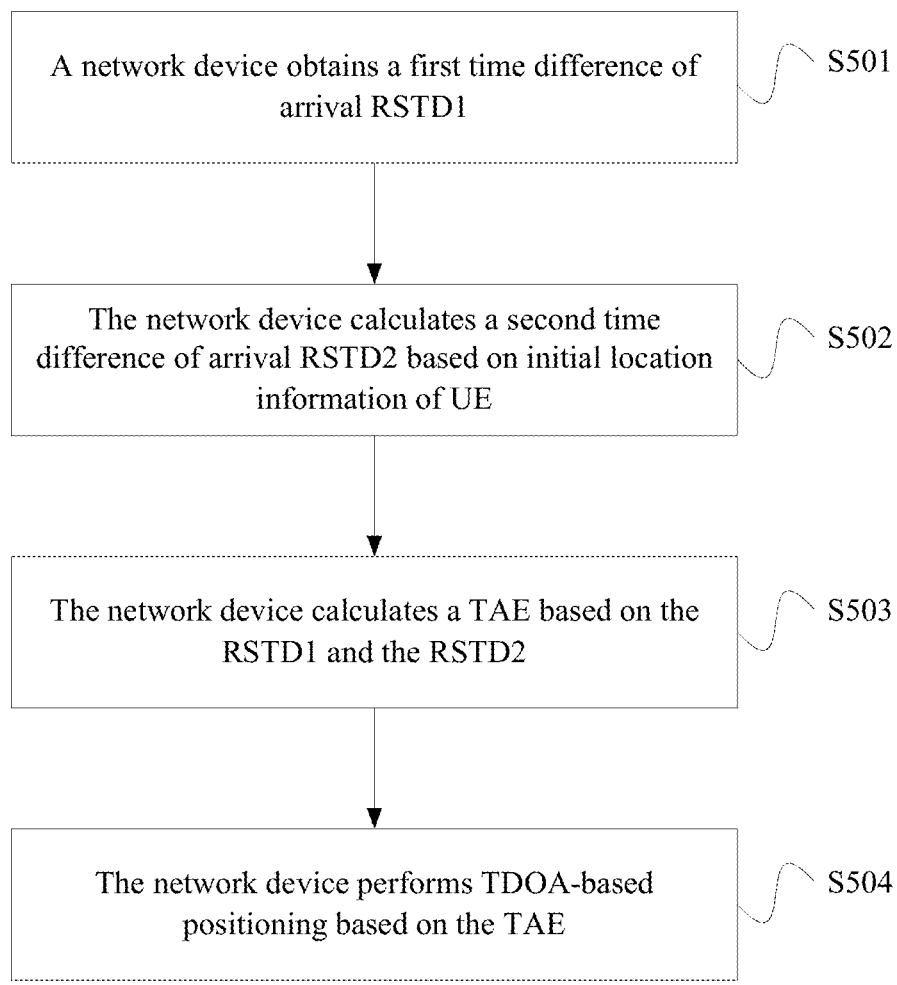
FIG. 7 is a schematic flowchart of Embodiment 5 of the positioning method based on a time difference of arrival according to the embodiments of the present disclosure.

FIG. 7 is a schematic flowchart of Embodiment 5 of the positioning method based on a time difference of arrival according to the embodiments of the present disclosure. As shown in FIG. 7, the method is executed by a network device, and the method includes the following steps.

S501. The network device obtains a first time difference of arrival RSTD1.

Depending on a sending entity of a positioning signal, the network device may use different RSTD1 obtaining methods.

S502. The network device calculates a second time difference of arrival RSTD2 based on initial location information of UE.

An initial location of the UE may be a fixed preset location. For example, the UE is placed on a positioning rod. Alternatively, another positioning technology, for example, the GPS technology, may be used to obtain the initial location information of the UE. Alternatively, the UE may move within a small range.

The method for calculating the RSTD2 by the network device based on the initial location information of the UE is the same as steps S301 to S304, except that the method is executed by the network device. Details are not repeated herein.

S503. The network device calculates a TAE based on the RSTD1 and the RSTD2.

S504. The network device performs TDOA-based positioning based on the TAE.

Specifically, a prior-art TDOA-based method may be used for positioning in a location service. However, during positioning, the TAE first needs to be subtracted from the RSTD, and a hyperbolic equation is set up based on the RSTD.

In this embodiment, the network device obtains the RSTD1 calculated based on an actual received time of the positioning signal; calculates the theoretical RSTD2 based on the location information of the UE; and obtains, based on a difference between the RSTD1 and the RSTD2, the TAE caused by base stations. In a positioning calculation process, the TAE is subtracted before positioning calculation. The TAE caused by the base stations is subtracted during positioning calculation. In other words, the time alignment error caused by the base stations is eliminated. Therefore, accuracy of TDOA-based positioning can be ensured.

In another embodiment, in a scenario in which reference signals are sent by base stations, namely, a downlink positioning signal sending scenario, step S501 is specifically:

receiving, by the network device, the first time difference of arrival RSTD1 reported by the UE, where the RSTD1 is obtained through calculation by the UE based on a first positioning signal sent by a first base station and a second positioning signal sent by a second base station.

For a method for calculating the RSTD1 by the UE, refer to the method in steps S101 to S103. Details are not repeated herein.

Figure 8:
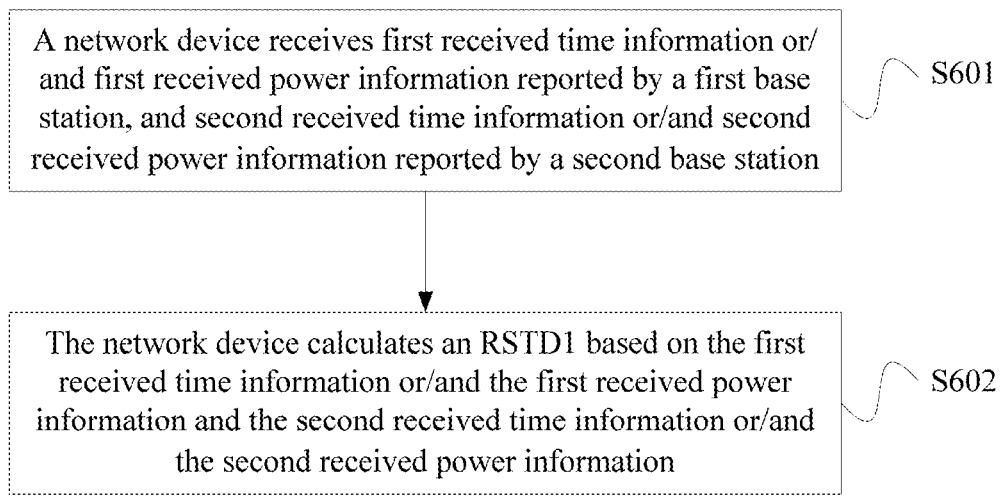
FIG. 8 is a schematic flowchart of Embodiment 6 of the positioning method based on a time difference of arrival according to the embodiments of the present disclosure.

FIG. 8 is a schematic flowchart of Embodiment 6 of the positioning method based on a time difference of arrival according to the embodiments of the present disclosure. As shown in FIG. 8, in a scenario in which a reference signal is sent by the UE, namely, an uplink positioning signal sending scenario, step S501 is specifically:

S601. The network device receives first received time information or/and first received power information reported by a first base station, and second received time information or/and second received power information reported by a second base station.

Specifically, the UE sends a positioning signal to both the first base station and the second base station simultaneously; the first base station and the second base station receive the positioning signal, and send received times or/and received powers of the positioning signal to the network device.

S602. The network device calculates the RSTD1 based on the first received time information or/and the first received power information and the second received time information or/and the second received power information.

An implementation of step S503 may be:

The network device calculates a difference between the RSTD1 and the RSTD2, and uses the difference as the target TAE.

This embodiment is applicable to a scenario in which the UE is located in a fixed preset location, or a location of the UE is obtained by using another positioning technology, or in other words, a scenario in which the initial location information of the UE is accurate. In this scenario, the UE sends the accurate location information to the network device, and then the RSTD2 calculated by the network device based on the location information may be used as a reference value for TAE calculation. The TAE is obtained after the reference value is subtracted from the RSTD1 calculated by the UE based on the actual received time. In this way, accuracy of the TAE is ensured.

Figure 9:
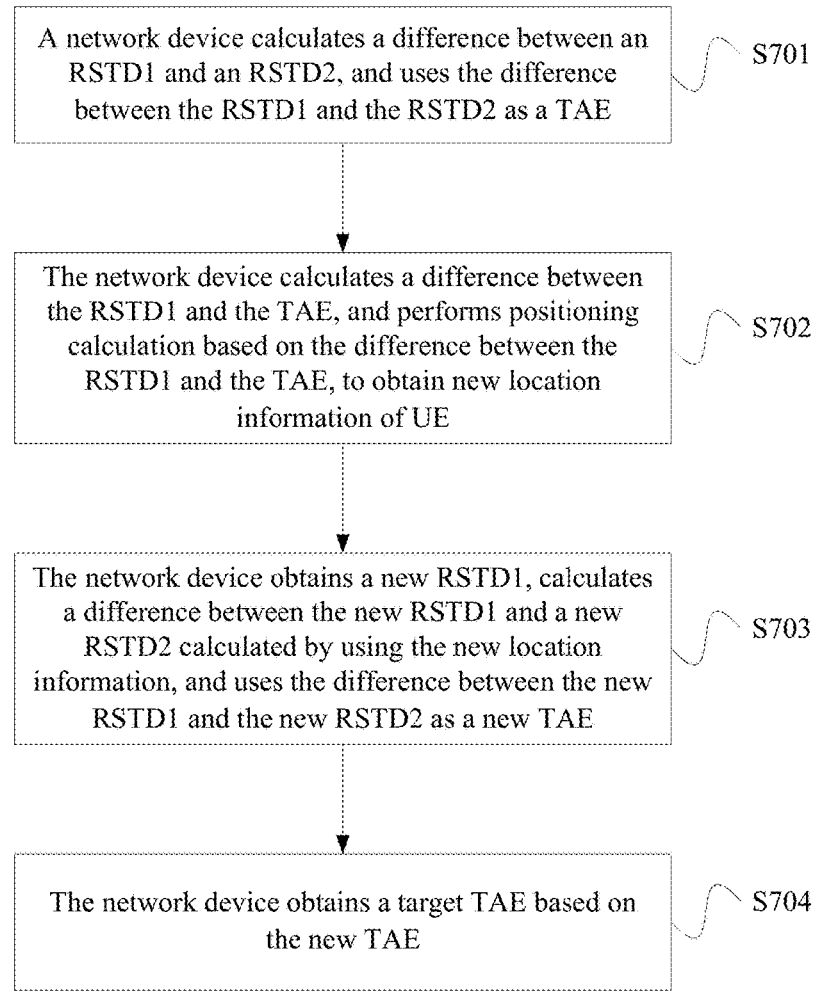
FIG. 9 is a schematic flowchart of Embodiment 7 of the positioning method based on a time difference of arrival according to the embodiments of the present disclosure.

FIG. 9 is a schematic flowchart of Embodiment 7 of the positioning method based on a time difference of arrival according to the embodiments of the present disclosure. As shown in FIG. 9, another implementation of step S503 may be:

S701. The network device calculates a difference between the RSTD1 and the RSTD2, and uses the difference between the RSTD1 and the RSTD2 as a TAE.

S702. The network device calculates a difference between the RSTD1 and the TAE, and performs positioning calculation based on the difference between the RSTD1 and the TAE, to obtain new location information of the UE.

S703. The network device obtains a new RSTD1, calculates a difference between the new RSTD1 and a new RSTD2 calculated by using the new location information, and uses the difference between the new RSTD1 and the new RSTD2 as a new TAE.

S704. The network device obtains the target TAE based on the new TAE.

The network device may perform steps S702 and S703 for a preset quantity of cycles. The preset quantity of cycles may be based on the following principle: When calculated location information of the UE converges near a fixed location, the location information then is considered to be accurate, and a TAE determined then is also an accurate TAE, and in this case, the cycling can be stopped. When the cycling is stopped, the new TAE calculated may be used as the target TAE for the network device to position different UEs.

If the location information of the UE is estimated information, the cyclic calculation method in this embodiment may be used to perform TAE calculation for a plurality of times. Each TAE is calculated based on last calculated location information of the UE. After a plurality of cycles, the calculated TAE is an accurate TAE. Therefore, in this embodiment, even if the UE location is not fixed, the accurate TAE can still be calculated, ensuring accuracy of subsequent TDOA-based positioning.

Further, based on the foregoing calculated TAE, the network device may also use the same method to calculate a plurality of TAEs, perform weighting processing on the plurality of TAEs to update the target TAE, and use the target TAE to perform TDOA-based positioning.

The method for performing weighting processing on the plurality of TAEs is the same as the two implementations of step S402, and details are not repeated herein.

In another embodiment, in a scenario in which the UE is located in a fixed preset location, or a location of the UE is obtained by using another positioning technology, before step S502, the method further includes:

receiving, by the network device, the initial location information reported by the UE.

In this embodiment, the UE is located in a fixed preset location. In other words, the initial location information of the UE is accurate. The UE sends the accurate location information to the network device, and then the RSTD2 calculated by the network device based on the location information may be used as a reference value for TAE calculation. The TAE is obtained after the reference value is subtracted from the RSTD1 calculated by the UE based on the actual received time. In this way, accuracy of the TAE is ensured.

In another embodiment, in a scenario in which the UE moves within a small range, or in other words, the UE is not in a fixed preset location, before step S502, the method further includes:

performing, by the network device, calculation to obtain the initial location information of the UE.

In this embodiment, the UE is not in a fixed preset location. In this scenario, the network device may calculate the initial location information of the UE by using a specific positioning approach. This initial location information is estimated location information.

In another embodiment, after obtaining the target TAE according to the foregoing method, the network device sends the target TAE to the UE or another UE, for positioning of the UE or the another UE.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a ROM, a RAM, a magnetic disk, or an optical disc.

Figure 10:
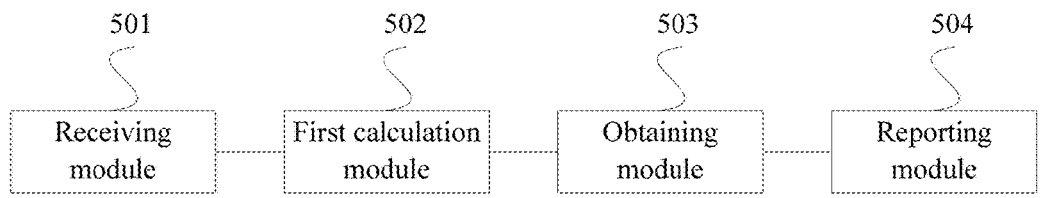
FIG. 10 is a diagram of a modular structure of Embodiment 1 of user equipment according to the embodiments of the present disclosure.

FIG. 10 is a diagram of a modular structure of Embodiment 1 of user equipment according to the embodiments of the present disclosure. As shown in FIG. 10, the user equipment includes:

a receiving module 501, configured to receive a first positioning signal sent by a first base station at a first moment and a second positioning signal sent by a second base station at the first moment;

a first calculation module 502, configured to obtain a first time difference of arrival RSTD1 based on measurement information of the first positioning signal and measurement information of the second positioning signal, where the measurement information includes at least one of an arrival time of the positioning signal and a received power of the positioning signal;

an obtaining module 503, configured to obtain location information of the first base station, location information of the second base station, and location information of the UE; and a reporting module 504, configured to: obtain a time alignment error TAE based on the location information of the first base station, the location information of the second base station, the location information of the UE, and the RSTD1, and report the TAE to a network device, where the TAE is used for positioning.

The user equipment is configured to execute the foregoing method embodiments, with a similar implementation principle and a similar technical effect. Details are not repeated herein.

In another embodiment, the reporting module 504 is specifically configured to: calculate a difference between the RSTD1 and an RSTD2, and use the difference as the TAE.

Figure 11:
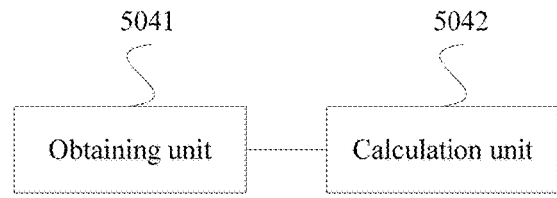
FIG. 11 is a diagram of a modular structure of Embodiment 2 of the user equipment according to the embodiments of the present disclosure.

FIG. 11 is a diagram of a modular structure of Embodiment 2 of the user equipment according to the embodiments of the present disclosure. As shown in FIG. 11, the reporting module 504 includes:

an obtaining unit 5041, configured to obtain a second time difference of arrival RSTD2 based on the location information of the first base station, the location information of the second base station, and the location information of the UE; and a calculation unit 5042, configured to: calculate a difference between the RSTD1 and the RSTD2, and use the difference as the TAE.

In another embodiment, the obtaining unit 5041 is specifically configured to:

calculate a first distance between the UE and the first base station based on the location information of the UE and the location information of the first base station; calculate a second distance between the UE and the second base station based on the location information of the UE and the location information of the second base station; calculate a difference between the first distance and the second distance; and calculate a ratio of the difference to an electromagnetic wave velocity, and use the ratio as the RSTD2.

Figure 12:
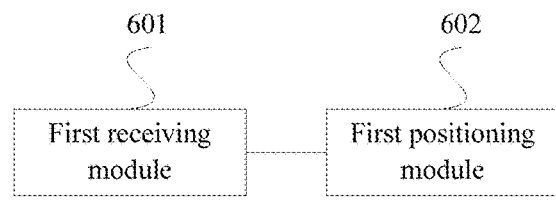
FIG. 12 is a diagram of a modular structure of Embodiment 1 of a network device according to the embodiments of the present disclosure.

FIG. 12 is a diagram of a modular structure of Embodiment 1 of a network device according to the embodiments of the present disclosure. As shown in FIG. 12, the network device includes:

a first receiving module 601, configured to receive a first TAE reported by UE; and a first positioning module 602, configured to perform TDOA-based positioning on at least one UE based on the first TAE.

Figure 13:
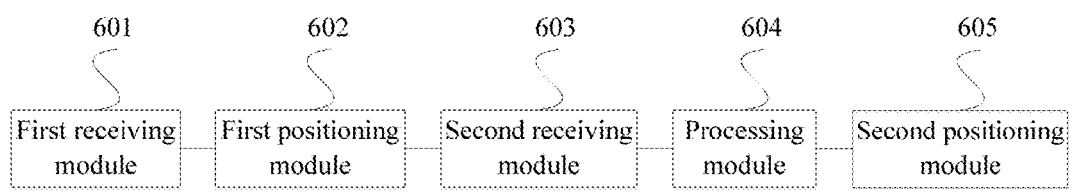
FIG. 13 is a diagram of a modular structure of Embodiment 2 of the network device according to the embodiments of the present disclosure.

FIG. 13 is a diagram of a modular structure of Embodiment 2 of the network device according to the embodiments of the present disclosure. As shown in FIG. 13, based on FIG. 12, the network device further includes:

a second receiving module 603, configured to receive at least one second TAE reported by the UE or by at least one other UE;

a processing module 604, configured to: perform weighting processing on the first TAE and the at least one second TAE, to obtain a target TAE; and a second positioning module 605, configured to perform TDOA-based positioning on the UE or the at least one other UE based on the target TAE.

The network device is configured to execute the foregoing method embodiments, with a similar implementation principle and a similar technical effect. Details are not repeated herein.

In another embodiment, the processing module 604 is specifically configured to: calculate an average value of the first TAE and the at least one second TAE, to obtain the target TAE.

Figure 14:
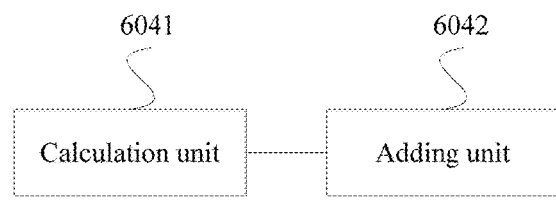
FIG. 14 is a diagram of a modular structure of Embodiment 3 of the network device according to the embodiments of the present disclosure.

FIG. 14 is a diagram of a modular structure of Embodiment 3 of the network device according to the embodiments of the present disclosure. As shown in FIG. 14, the processing module 604 includes:

a calculation unit 6041, configured to: calculate a product of a preset weight value of each TAE and each TAE value based on preset weight values of the first TAE and the at least one second TAE, and use the product as a weighted TAE corresponding to each TAE; and an adding unit 6042, configured to: add weighted TAEs of the first TAE and the at least one second TAE, and use a resulting sum as the target TAE.

Figure 15:
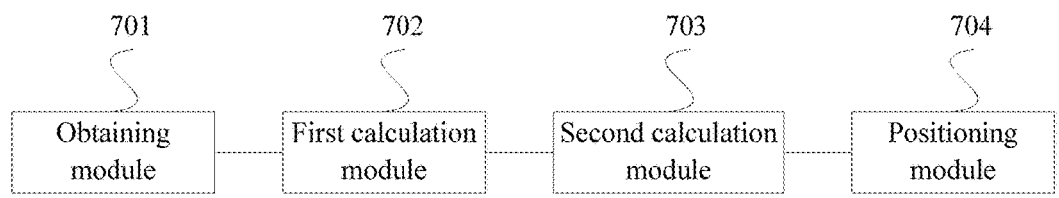
FIG. 15 is a diagram of a modular structure of Embodiment 1 of another network device according to the embodiments of the present disclosure.

FIG. 15 is a diagram of a modular structure of Embodiment 1 of another network device according to the embodiments of the present disclosure. As shown in FIG. 15, the network device includes:

an obtaining module 701, configured to obtain a first time difference of arrival RSTD1;

a first calculation module 702, configured to calculate a second time difference of arrival RSTD2 based on initial location information of UE;

a second calculation module 703, configured to calculate a TAE based on the RSTD1 and the RSTD2; and a positioning module 704, configured to perform TDOA-based positioning based on the TAE.

The network device is configured to execute the foregoing method embodiments, with a similar implementation principle and a similar technical effect. Details are not repeated herein.

In another embodiment, the second calculation module 703 is specifically configured to: calculate a difference between the RSTD1 and the RSTD2, and use the difference as the target TAE.

Figure 16:
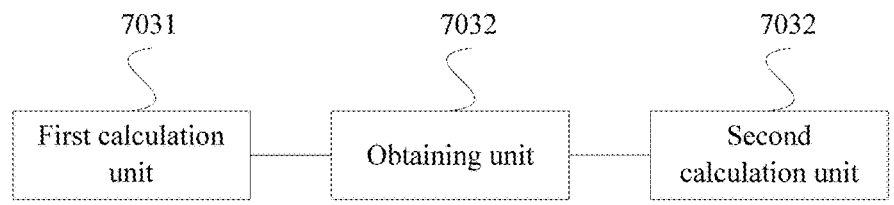
FIG. 16 is a diagram of a modular structure of Embodiment 2 of the another network device according to the embodiments of the present disclosure.

FIG. 16 is a diagram of a modular structure of Embodiment 2 of the another network device according to the embodiments of the present disclosure. As shown in FIG. 16, the second calculation module 703 includes:

a first calculation unit 7031, configured to: calculate a difference between the RSTD1 and the RSTD2, and use the difference between the RSTD1 and the RSTD2 as a TAE;

an obtaining unit 7032, configured to: calculate a difference between the RSTD1 and the TAE, and perform positioning calculation based on the difference between the RSTD1 and the TAE, to obtain new location information of the UE; and a second calculation unit 7033, configured to: obtain a new RSTD1; calculate a difference between the new RSTD1 and a new RSTD2 calculated by using the new location information; and use the difference between the new RSTD1 and the new RSTD2 as a new TAE.

In another embodiment, the obtaining module 701 is specifically configured to receive the first time difference of arrival RSTD1 reported by the UE, where the RSTD1 is obtained through calculation by the UE based on a first positioning signal sent by a first base station and a second positioning signal sent by a second base station.

In another embodiment, the obtaining module 701 is further specifically configured to: receive first received time information or/and first received power information reported by a first base station, and second received time information or/and second received power information reported by a second base station; and calculate the first time difference of arrival RSTD1 based on the first received time information or/and the first received power information and the second received time information or/and the second received power information.

Figure 17:
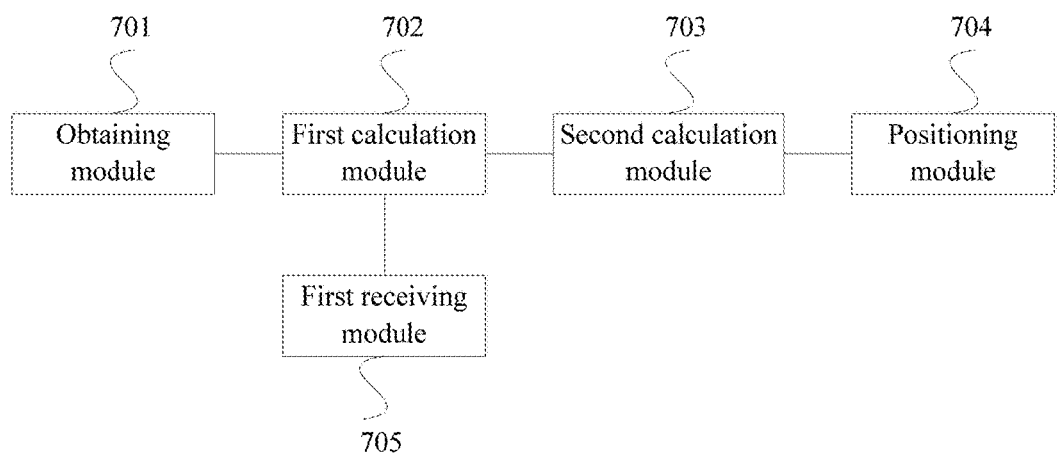
FIG. 17 is a diagram of a modular structure of Embodiment 3 of the another network device according to the embodiments of the present disclosure.

FIG. 17 is a diagram of a modular structure of Embodiment 3 of the another network device according to the embodiments of the present disclosure. As shown in FIG. 17, based on FIG. 15, the network device further includes:

a first receiving module 705, configured to: before the first calculation module 702 calculates the second time difference of arrival RSTD2 based on the initial location information of the UE, receive the initial location information reported by the UE.

Figure 18:
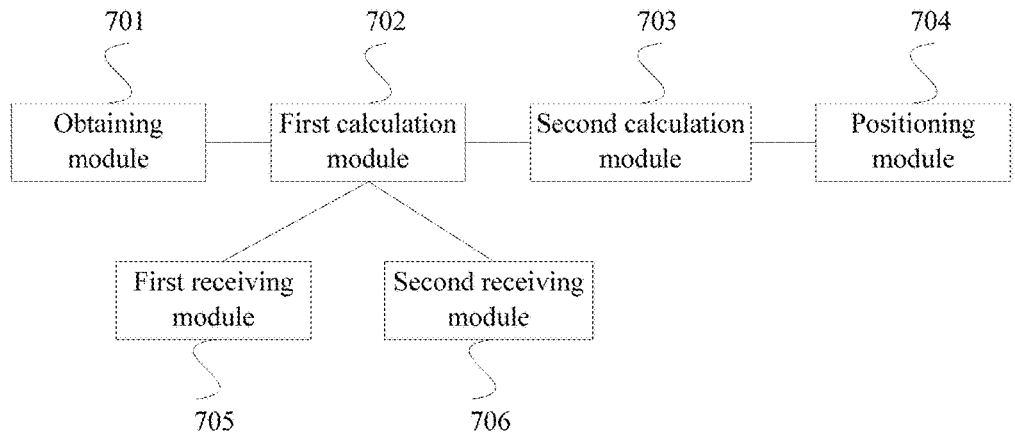
FIG. 18 is a diagram of a modular structure of Embodiment 4 of the another network device according to the embodiments of the present disclosure.

FIG. 18 is a diagram of a modular structure of Embodiment 4 of the another network device according to the embodiments of the present disclosure. As shown in FIG. 18, based on FIG. 17, the network device further includes:

a second receiving module 706, configured to: before the first calculation module 702 calculates the second time difference of arrival RSTD2 based on the initial location information of the UE, calculate the initial location information of the UE.

Figure 19:
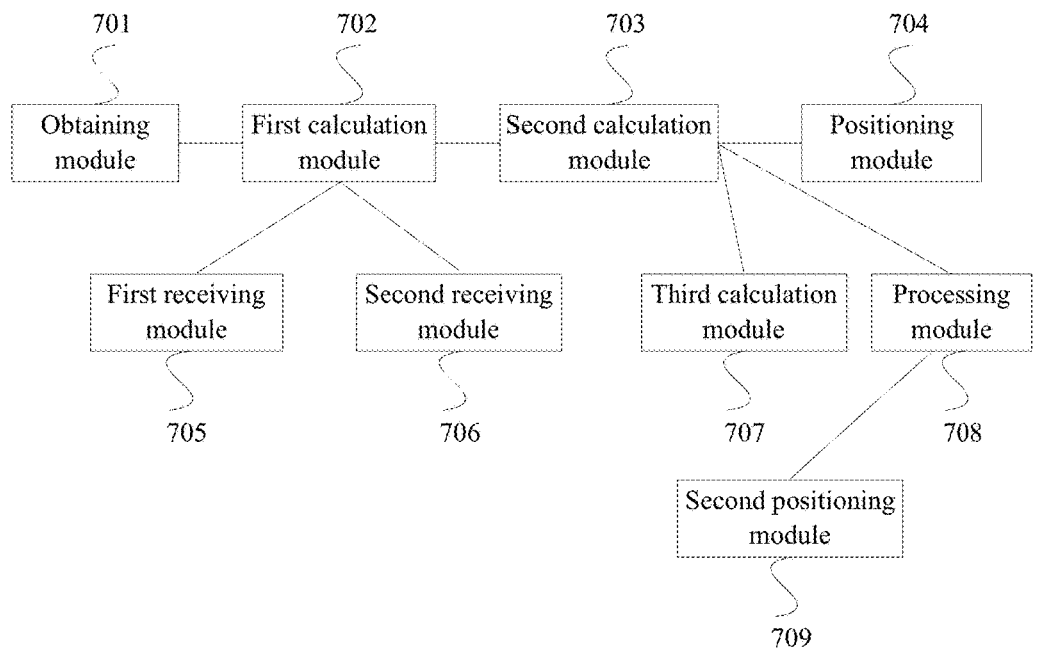
FIG. 19 is a diagram of a modular structure of Embodiment 5 of the another network device according to the embodiments of the present disclosure.

FIG. 19 is a diagram of a modular structure of Embodiment 5 of the another network device according to the embodiments of the present disclosure. As shown in FIG. 19, based on FIG. 18, the network device further includes:

a third calculation module 707, configured to calculate at least one other TAE after the second calculation module 703 calculates the TAE based on the RSTD1 and the RSTD2;

a processing module 708, configured to: perform weighting processing on the TAE and the at least one other TAE, to obtain a target TAE; and a second positioning module 709, configured to perform TDOA-based positioning based on the target TAE.

In another embodiment, the processing module 708 is specifically configured to: calculate an average value of the TAE and the at least one other TAE, to obtain the target TAE.

Figure 20:
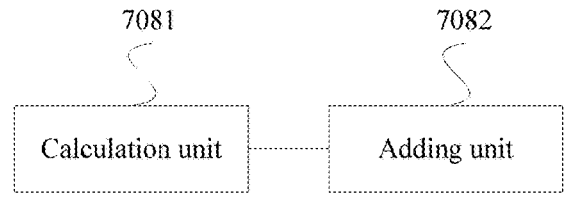
FIG. 20 is a diagram of a modular structure of Embodiment 6 of the another network device according to the embodiments of the present disclosure.

FIG. 20 is a diagram of a modular structure of Embodiment 6 of the another network device according to the embodiments of the present disclosure. As shown in FIG. 20, the processing module 708 includes:

a calculation unit 7081, configured to: calculate a product of a preset weight value of each TAE and each TAE value based on preset weight values of the TAE and the at least one other TAE, and use the product as a weighted TAE corresponding to each TAE; and an adding unit 7082, configured to: add weighted TAEs of the TAE and the at least one other TAE, and use a resulting sum as the target TAE.

Figure 21:
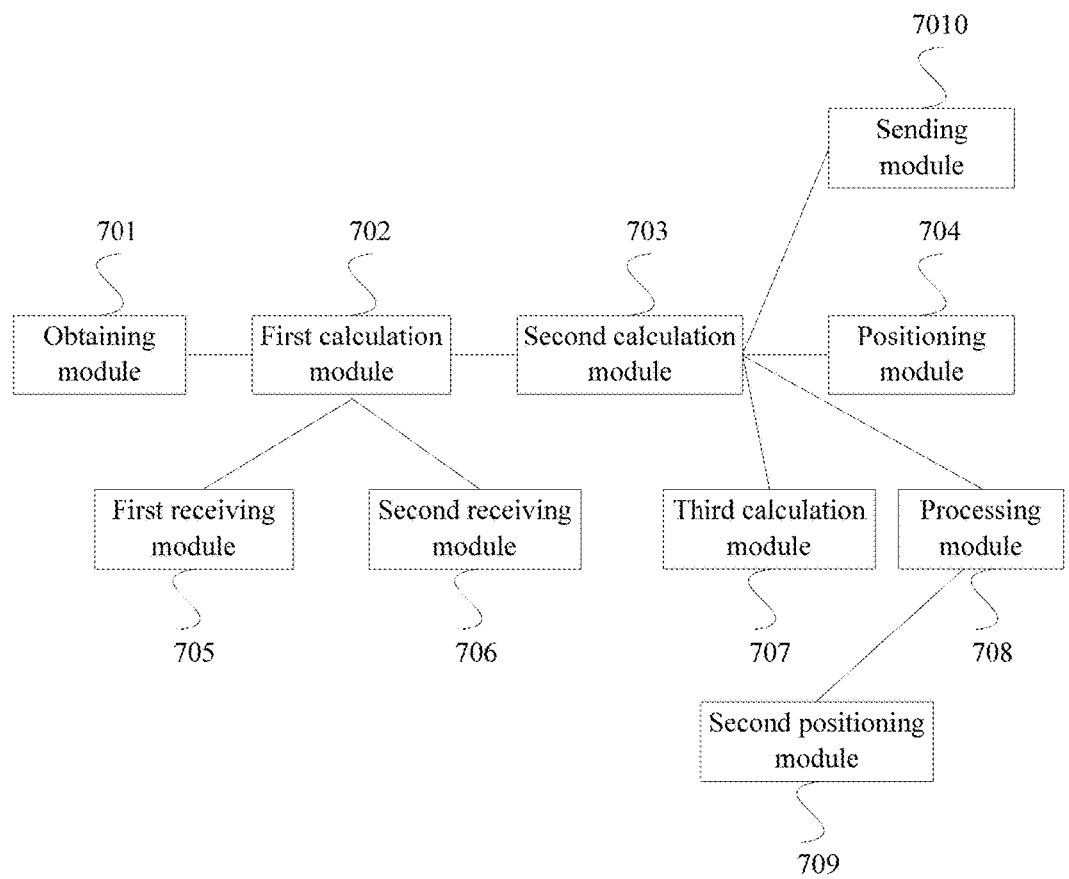
FIG. 21 is a diagram of a modular structure of Embodiment 7 of the another network device according to the embodiments of the present disclosure.

FIG. 21 is a diagram of a modular structure of Embodiment 7 of the another network device according to the embodiments of the present disclosure. As shown in FIG. 21, based on FIG. 19, the network device further includes:

a sending module 7010, configured to send the target TAE to the UE or another UE.

Figure 22:
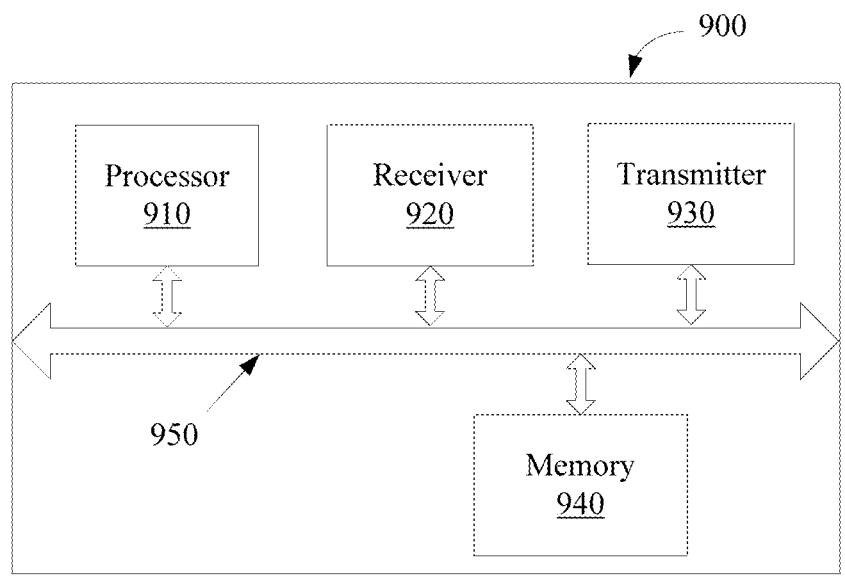
FIG. 22 is a schematic structural diagram of Embodiment 1 of user equipment 900 according to the embodiments of the present disclosure.

FIG. 22 is a schematic structural diagram of Embodiment 1 of user equipment 900 according to the embodiments of the present disclosure. As shown in FIG. 22, the user equipment includes a processor 910, a receiver 920, a transmitter 930, a memory 940, and a bus system 950.

Specifically, the memory 940 may include a read-only memory or a random access memory, and provide an instruction and data for the processor 910. The processor 910 may be a central processing unit CPU, a digital signal processor DSP, an application-specific integrated circuit ASIC, a field programmable gate array FPGA, or another programmable logic device. A part of the memory 940 may further include a non-volatile random access memory (NVRAM). The transmitter 930 is configured to generate a to-be-transmitted signal and send the signal. Components of the user equipment 900 are coupled together by using the bus system 950. In addition to a data bus, the bus system 950 further includes a power bus, a control bus, or a status signal bus. However, for clear description, various buses are denoted by the bus system 950 in the figure. Specifically, in this embodiment:

The receiver 920 is configured to receive a first positioning signal sent by a first base station at a first moment and a second positioning signal sent by a second base station at the first moment.

The processor 910 is configured to: obtain a first time difference of arrival RSTD1 based on an arrival time or/and an arrival power of the first positioning signal and an arrival time or/and an arrival power of the second positioning signal; obtain location information of the first base station, location information of the second base station, and location information of the UE; and obtain a time alignment error TAE based on the location information of the first base station, the location information of the second base station, the location information of the UE, and the RSTD1.

The transmitter 930 is configured to report the TAE to a network device, where the TAE is used for positioning.

The user equipment 900 is configured to execute the method embodiments corresponding to the foregoing user equipment, with a similar implementation principle and a similar technical effect. Details are not repeated herein.

For specific implementations of the processor 910, refer to descriptions of the foregoing method embodiments. Details are not repeated herein.

Figure 23:
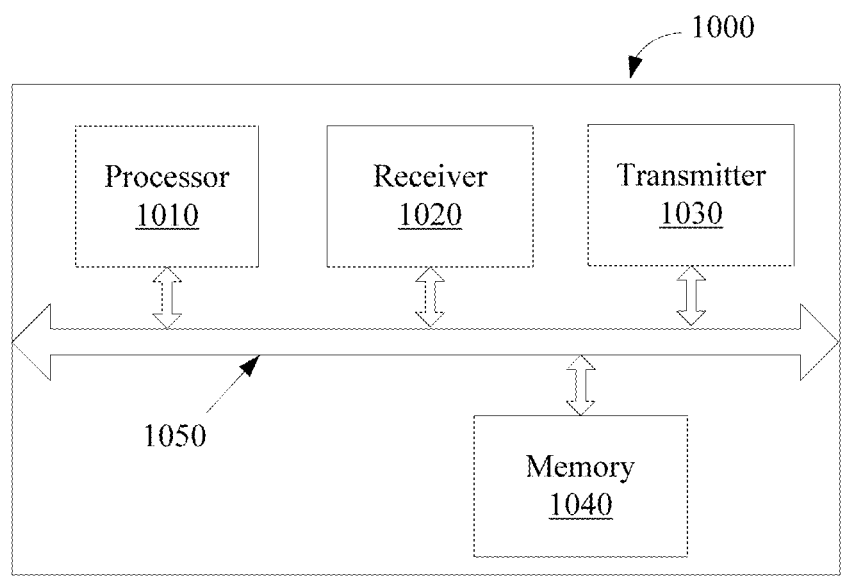
FIG. 23 is a schematic structural diagram of Embodiment 1 of a network device 1000 according to the embodiments of the present disclosure.

FIG. 23 is a schematic structural diagram of Embodiment 1 of a network device 1000 according to the embodiments of the present disclosure. As shown in FIG. 23, the network device includes a processor 1010, a receiver 1020, a transmitter 1030, a memory 1040, and a bus system 1050.

Specifically, the memory 1040 may include a read-only memory or a random access memory, and provide an instruction and data for the processor 1010. The processor 1010 may be a central processing unit CPU, a digital signal processor DSP, an application-specific integrated circuit ASIC, a field programmable gate array FPGA, or another programmable logic device. A part of the memory 1040 may further include a non-volatile random access memory (NVRAM). The transmitter 1030 is configured to generate a to-be-transmitted signal and send the signal. Components of the network device 1000 are coupled together by using the bus system 1050. In addition to a data bus, the bus system 1050 further includes a power bus, a control bus, or a status signal bus. However, for clear description, various buses are denoted by the bus system 1050 in the figure. Specifically, in this embodiment:

The receiver 1020 is configured to receive a first time alignment error TAE reported by UE.

The processor 1010 is configured to perform, based on the first TAE, positioning based on a time difference of arrival TDOA on at least one UE.

The network device 1000 is configured to execute the method embodiments corresponding to the foregoing first network device, with a similar implementation principle and a similar technical effect. Details are not repeated herein.

For specific implementations of the processor 1010, refer to descriptions of the foregoing method embodiments. Details are not repeated herein.

Figure 24:
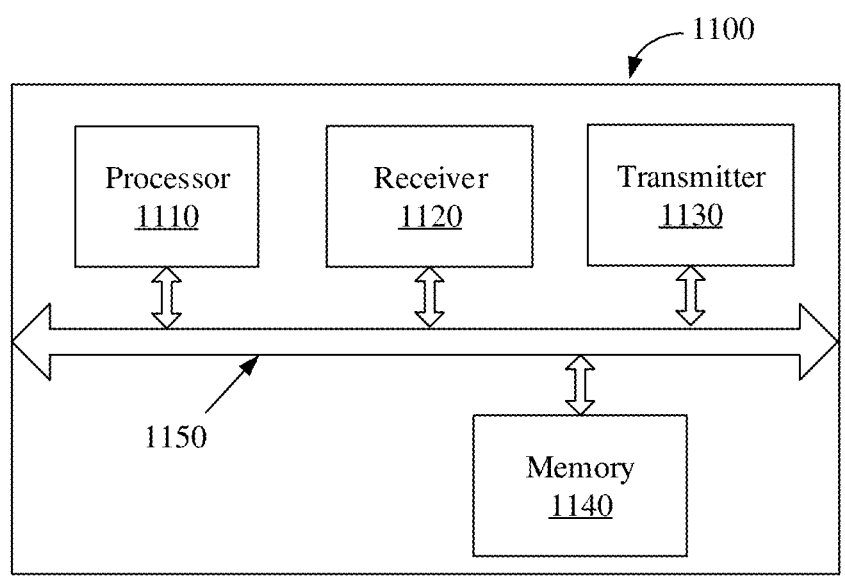
FIG. 24 is a schematic structural diagram of Embodiment 1 of a network device 1100 according to the embodiments of the present disclosure.

FIG. 24 is a schematic structural diagram of Embodiment 1 of a network device 1100 according to the embodiments of the present disclosure. As shown in FIG. 24, the network device includes a processor 1110, a receiver 1120, a transmitter 1130, a memory 1140, and a bus system 1150.

Specifically, the memory 1140 may include a read-only memory or a random access memory, and provide an instruction and data for the processor 1110. The processor 1110 may be a central processing unit CPU, a digital signal processor DSP, an application-specific integrated circuit ASIC, a field programmable gate array FPGA, or another programmable logic device. A part of the memory 1140 may further include a non-volatile random access memory (NVRAM). The transmitter 1130 is configured to generate a to-be-transmitted signal and send the signal. Components of the network device 1100 are coupled together by using the bus system 1150. In addition to a data bus, the bus system 1150 further includes a power bus, a control bus, or a status signal bus. However, for clear description, various buses are denoted by the bus system 1150 in the figure. Specifically, in this embodiment:

The receiver 1120 is configured to obtain a first time difference of arrival RSTD1.

The processor 1110 is configured to: calculate a second time difference of arrival RSTD2 based on initial location information of UE; calculate a TAE based on the RSTD1 and the RSTD2; and perform, based on the TAE, positioning based on a time difference of arrival TDOA.

The network device 1100 is configured to execute the method embodiments corresponding to the foregoing second network device, with a similar implementation principle and a similar technical effect. Details are not repeated herein.

For specific implementations of the processor 1110 and the transmitter 1130, refer to descriptions of the foregoing method embodiments. Details are not repeated herein.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A positioning method based on a time difference of arrival, the method comprising:
   obtaining, by a network device, a first time difference of arrival (RSTD1);
   calculating, by the network device, a second time difference of arrival (RSTD2) based on initial location information of user equipment (UE);
   calculating, by the network device, a time alignment error (TAE) based on the RSTD1 and the RSTD2, comprising:
      calculating, by the network device, a difference between the RSTD1 and the RSTD2, and using the difference between the RSTD1 and the RSTD2 as the TAE,
      calculating, by the network device, a difference between the RSTD1 and the TAE, and performing positioning calculation based on the difference between the RSTD1 and the TAE, to obtain new location information of the UE,
      obtaining, by the network device, a new RSTD1, calculating a difference between the new RSTD1 and a new RSTD2 calculated by using the new location information, and using the difference between the new RSTD1 and the new RSTD2 as a new TAE, and
      obtaining, by the network device, a target TAE based on the new TAE; and
   performing, by the network device based on the target TAE, positioning based on a time difference of arrival (TDOA).

2. The method according to claim 1, wherein obtaining, by the network device, the RSTD1 comprises:
   receiving, by the network device, the RSTD1 reported by the UE, wherein the RSTD1 is obtained through calculation by the UE based on a first positioning signal sent by a first base station and a second positioning signal sent by a second base station.

3. The method according to claim 1, wherein obtaining, by the network device, the RSTD1 comprises:
   receiving, by the network device, first received time information and/or first received power information reported by a first base station, and second received time information and/or second received power information reported by a second base station; and
   calculating, by the network device, the RSTD1 based on the first received time information and/or the first received power information and the second received time information and/or the second received power information.

4. The method according to claim 1, wherein before calculating, by the network device, the RSTD2 based on the initial location information of the UE, the method further comprises:
   receiving, by the network device, the initial location information reported by the UE.

5. The method according to claim 1, wherein before calculating, by the network device, the RSTD2 based on the initial location information of the UE, the method further comprises:
   calculating, by the network device, the initial location information of the UE.

6. A positioning method based on a time difference of arrival, the method comprising:
   obtaining, by a network device, a first time difference of arrival (RSTD1);
   calculating, by the network device, a second time difference of arrival (RSTD2) based on initial location information of user equipment (UE);
   calculating, by the network device, a time alignment error (TAE) based on the RSTD1 and the RSTD2;
   calculating, by the network device, at least one other TAE;
   performing, by the network device, weighting processing on the TAE and the at least one other TAE, to obtain a target TAE; and
   performing, by the network device, TDOA-based positioning based on the target TAE.

7. The method according to claim 6, wherein performing, by the network device, weighting processing on the TAE and the at least one other TAE, to obtain the target TAE comprises:
   calculating, by the network device, an average value of the TAE and the at least one other TAE, to obtain the target TAE.

8. The method according to claim 6, wherein performing, by the network device, weighting processing on the TAE and the at least one other TAE, to obtain the target TAE comprises:
   calculating, by the network device, a product of a preset weight value of each TAE and each TAE value based on preset weight values of the TAE and the at least one other TAE, and using the product as a weighted TAE corresponding to each TAE; and
   adding, by the network device, weighted TAEs of the TAE and the at least one other TAE, and using a resulting sum as the target TAE.

9. A network device, comprising:
   a receiver, configured to obtain a first time difference of arrival (RSTD1); and
   a processor, configured to:
      calculate a second time difference of arrival (RSTD2) based on initial location information of user equipment (UE);
      calculate a time alignment error (TAE) based on the RSTD1 and the RSTD2;
      calculate a difference between the RSTD1 and the RSTD2, and use the difference between the RSTD1 and the RSTD2 as the TAE;
      calculate a difference between the RSTD1 and the TAE, and perform positioning calculation based on the difference between the RSTD1 and the TAE, to obtain new location information of the UE;
      obtain a new RSTD1, calculate a difference between the new RSTD1 and a new RSTD2 calculated by using the new location information, and use the difference between the new RSTD1 and the new RSTD2 as a new TAE;
      obtain a target TAE based on the new TAE; and
      perform, based on the target TAE, positioning based on a time difference of arrival (TDOA).

10. The network device according to claim 9, wherein the receiver is further configured to receive the RSTD1 reported by the UE, wherein the RSTD1 is obtained through calculation by the UE based on a first positioning signal sent by a first base station and a second positioning signal sent by a second base station.

11. The network device according to claim 9, wherein the receiver is further configured to receive first received time information reported by a first base station and second received time information reported by a second base station; and correspondingly, the processor is further configured to calculate the RSTD1 based on the first received time information and the second received time information.

12. The network device according to claim 9, wherein the processor is further configured to:
before calculating the RSTD2 based on the initial location information of the UE, receive the initial location information reported by the UE.

13. The network device according to claim 9, wherein the processor is further configured to: before calculating the RSTD2 based on the initial location information of the UE, calculate the initial location information of the UE.

14. A network device, comprising:
a receiver, configured to obtain a first time difference of arrival (RSTD1); and
a processor, configured to:
calculate a second time difference of arrival (RSTD2) based on initial location information of user equipment (UE),
calculate a time alignment error (TAE) based on the RSTD1 and the RSTD2,
calculate at least one other TAE after calculating the TAE based on the RSTD1 and the RSTD2;
perform weighting processing on the TAE and the at least one other TAE, to obtain a target TAE; and
perform time difference of arrival (TDOA)-based positioning based on the target TAE.

15. The network device according to claim 14, wherein the processor is further configured to:
calculate an average value of the TAE and the at least one other TAE, to obtain the target TAE.

16. The network device according to claim 14, wherein the processor is further configured to:
calculate a product of a preset weight value of each TAE and each TAE value based on preset weight values of the TAE and the at least one other TAE, and use the product as a weighted TAE corresponding to each TAE; and
add weighted TAEs of the TAE and the at least one other TAE, and use a resulting sum as the target TAE.

* * * * *